Dec. 28, 1965     A. G. AUGUNAS     3,225,621

REMOTELY CONTROLLED MIRROR

Filed Nov. 17, 1961     2 Sheets-Sheet 1

INVENTOR.
Algis G. Augunas
BY
Paul J. Reising
ATTORNEY

Dec. 28, 1965  A. G. AUGUNAS  3,225,621
REMOTELY CONTROLLED MIRROR
Filed Nov. 17, 1961  2 Sheets-Sheet 2

INVENTOR.
Algis G. Augunas
BY
Paul J. Reising
ATTORNEY

United States Patent Office 3,225,621
Patented Dec. 28, 1965

3,225,621
REMOTELY CONTROLLED MIRROR
Algis G. Augunas, Detroit, Mich., assignor to General Motors Corporation, Detroit, Mich., a corporation of Delaware
Filed Nov. 17, 1961, Ser. No. 153,100
7 Claims. (Cl. 74—501)

This invention pertains to vehicle rear view mirrors and more particularly to outside rear view mirrors of the type with remote control means for adjusting the angle of the mirror from within the vehicle.

Remotely controlled mirrors of the type to which this invention relates typically comprise a mirror suitably supported on the exterior of the vehicle, such as on a door or fender and a control or actuator member mounted within the vehicle, the actuator member and the mirror being operatively connected to accomplish mirror angle adjustment in response to movement of the actuator member by the vehicle operator. The connecting means can be one of several well-known types such, for example, as a direct mechanical connection of levers and pivots, a fluid system or flexible operating cables of the Bowden wire type. One of the problems in mirrors of this type has been that the range of mirror adjustment has been limited to what can be effected by the operating means connecting the mirror and the remotely located actuator. This problem is particularly apparent with respect to cable operated mirrors in which any attempt to adjust the mirror support independently of operation of the cables can result in twisting and fouling of the operating cables.

It is a principal object of this invention to provide an improved remotely controlled mirror in which the mirror support may be adjusted not only by the remotely located actuator but also by means completely independent of the actuator without disabling the action of the latter.

It is another object of this invention to provide a remotely controlled mirror mechanism of the cable-operated type comprising a plurality of operating cables having the opposite ends thereof respectively indirectly connected to a mirror support and directly connected to the actuator, and in which the mirror support is adjustably mounted to a mounting bracket for manual adjustment independently of operation of the cables.

In general, these and other objects of this invention are attained by a remotely controlled mirror mechanism comprising a mounting bracket with a mirror support universally pivotally mounted thereon. A disk member peripherally engages a portion of the mirror support and provides for rotation of the mirror support about a fixed axis relative to and independent of adjustment of the disk member. An actuator is located remotely from the aforementioned mounting bracket, and a plurality of cables having the opposite ends thereof respectively directly connected to the aforementioned disk member and actuator. The aforedescribed structure perimts the mirror support to be universally pivotally adjusted to and retained in a selected position by means of the operating cables upon adjustment of the actuator, while the mirror may be manually rotated about its pivotal connection to the mounting bracket to provide a greater range of mirror adjustment independently of movement of the disk member and without twisting fouling or otherwise disabling the action of the operating cables.

The structure and function of the aforementioned mirror mechanism will become apparent hereinafter as the description of the invention proceeds, and in which reference is made to the following drawings in which.

Figure 1:
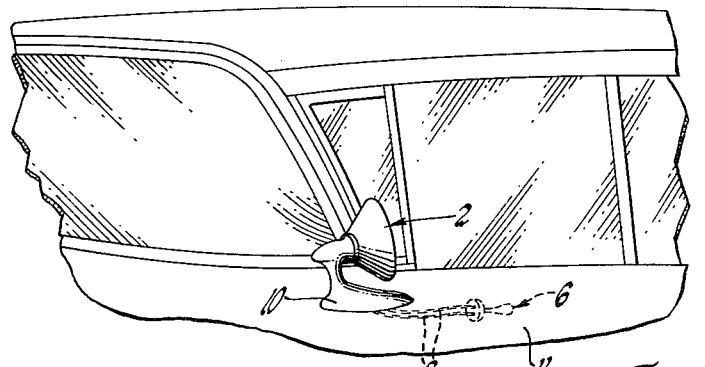
FIGURE 1 is a fragmentary perspective view of an automotive passenger vehicle equipped with the remotely controlled mirror mechanism of this invention.

The drawings, and particularly FIGURE 1 thereof, show one illustrative embodiment of the invention in which a mirror structure 2 is located on a door 4 of an automotive vehicle exteriorly of the passenger compartment, and is adapted to be remotely positioned by an actuator 6 mounted on the inside panel of the door 4. The mirror structure 2 and actuator 6 are operatively connected by means of two operating Bowden wires 8 comprising the usual wire enclosed within a sheathing. As will become readily apparent as the description proceeds, the mirror structure 2 may be mounted exteriorly of the vehicle in positions other than on the door 4, such as on a front fender of the vehicle, while the actuator 6 may be located in other positions within the vehicle passenger compartment such as on or below the instrument panel or dashboard thereof.

Figure 3:
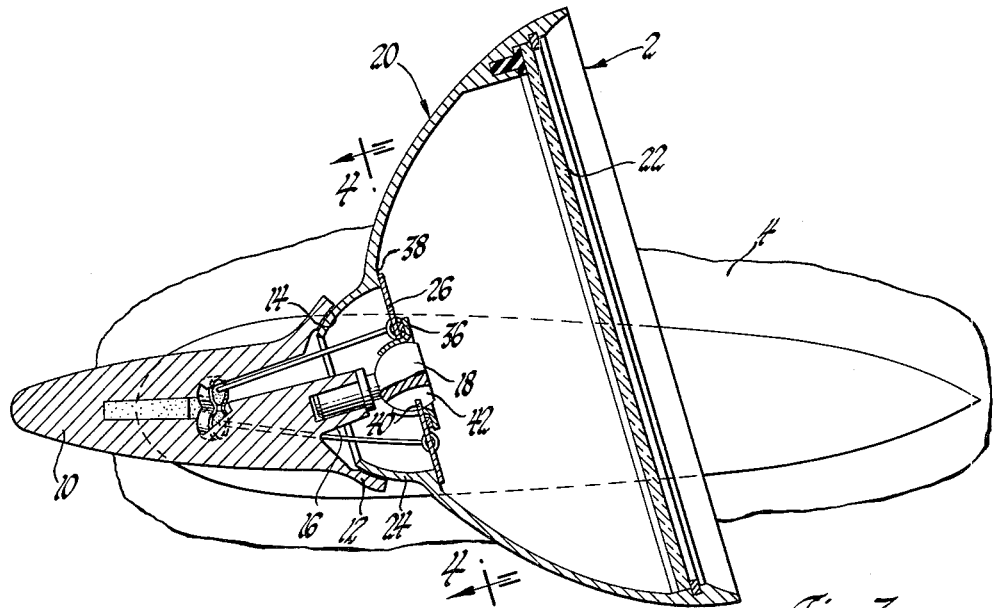
FIGURE 3 is a plan view of the mirror structure shown in FIGURE 2.
Figure 4:
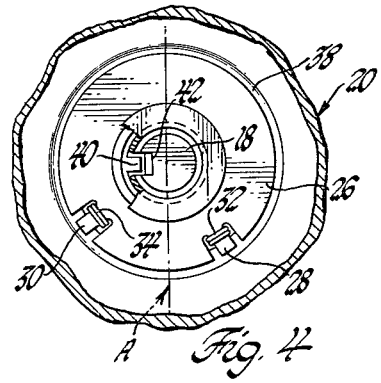
FIGURE 4 is a section taken on line 4—4 of FIGURE 3.

The mirror structure 2 comprises a mounting bracket 10 having its lower end secured to the exterior panel of the vehicle door 4 while its upper end includes an open ended housing 12 terminating with a spherical bearing surface 14. A boss 16 is formed with the bracket in a position centrally located with respect to the bearing surface 14 and serves to accommodate one end of a ball member 18 that projects axially from the boss and is rigidly retained therein. A mirror support, generally indicated as 20 includes a conventional mirror assembly or element 22 at the open end thereof with the opposite ends formed in a spherical configuration 24 which is adapted to be seated within the bearing surface 14 for universal adjustment of the mirror support 20. As best seen in FIGURES 3 and 4, a cable connector or disk member 26 is interiorly associated with the mirror support and has a pair of circumferentially spaced prong members 28 and 30 formed adjacent the periphery of the disk member. The annular area adjacent the peripheral portion of the disk member is seated on a circular flange 38 formed in the inner portion of the mirror support member 20 adjacent the spherical portion 24. The prong members 28 and 30 are respectively located from a vertical centerline A, an angular distance equal to 145° and 235° so that the included angle between the two prongs is 90°. This displacement has been found to be the most effective for obtaining the desired adjustment of the mirror support when utilizing two operating wires. The prong members 28 and 30, respectively serve as mounting means for ends 32 and 34 of the Bowden wires which are connected with the actuator 6 at the opposite ends thereof.

The inner edge of the disk member 26 abuts a centrally located spherical shaped socket 36 which mates with the ball 18 to provide a universal pivot joint. In order to take up any loose tolerances it is desirable to include a spring member between the disk member and the outwardly extending flange on the socket 36 as shown. A locking tab 40 projects from the disk member 26 and is accommodated within an enlarged slot 42 located in the ball 18 so that rotation of the disk member about the longitudinal axis of the ball member is prevented, however, pivotal movement of the disk member about mutually perpendicular axes is permitted.

Figure 2:
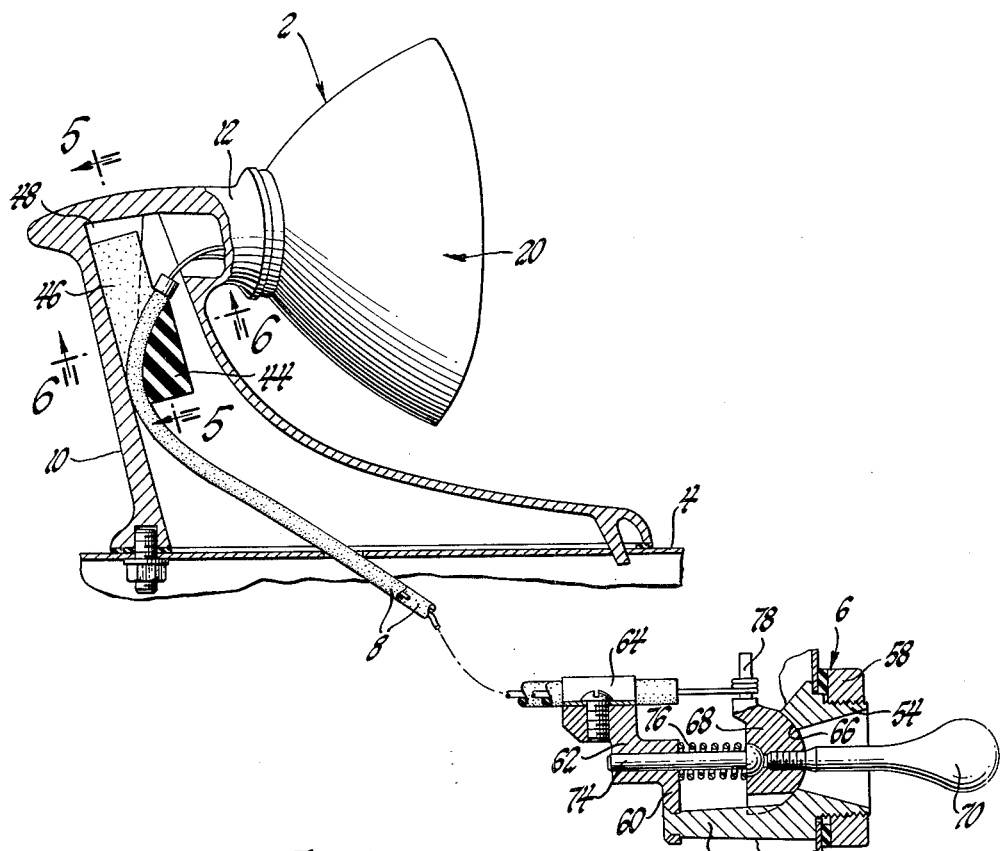
FIGURE 2 is a vertical sectional view of the exteriorly mounted mirror structure and remotely located actuator, and shows the operative relationship of these parts.
Figure 5:
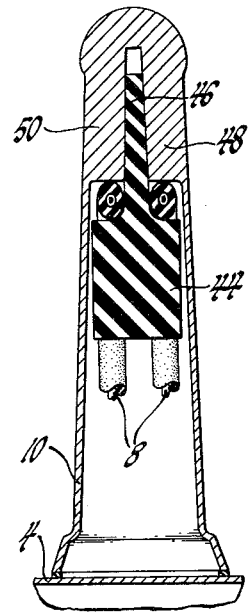
FIGURE 5 is a section taken on line 5—5 of FIGURE 2.
Figure 6:
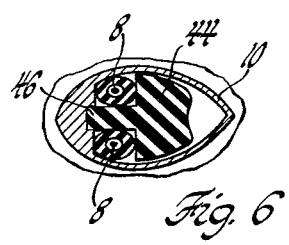
FIGURE 6 is a section taken on line 6—6 of FIGURE 2.

Referring to FIGURES 5 and 6, the bracket 10 incorporates a cable support member 44 that serves to separate the individual wire sheaths and also serves as a means retaining the end portions of the sheaths. As best seen in FIGURES 2 and 5, the cable support member 44 includes a projection 46 that extends in a slot defined by retaining walls 48 and 50 formed integrally with the bracket 10 in the upper portion thereof.

The actuator assembly 6 for controlling the adjustment of the mirror support 20 is shown in FIGURE 2 and comprises a tubular housing or body 52 joined to a threaded bushing 54 that extends through an aperture with a support panel 56. The housing is retained upon the panel by a threaded nut 58 received on the bushing in abutting engagement with the panel. The base of the housing is closed by a plate 60 that includes a projecting boss 62 having an opening therethrough and two substantially equidistant spaced support channels, one of which is shown at 64, for receiving the sheathed ends of the Bowden wires. A spherical bearing surface 66 is adapted to receive the spherical ball member 68 to which the operating handle 70 is secured. The opposite face of the ball member 68 includes a spherical depression in which the head end of a pin 74 seats; the pin being slidably disposed within the boss 62 and biased into engagement with the ball member 68 by a coiled spring 76. A pair of rods, one of which is shown at 78, is connected with the ball member 68 for rigidly supporting each of the Bowden wires, in this instance, by winding the end portions of the wire around each rod.

In operation, the Bowden wires are capable of operation both in tension and compression and thereby serve to universally position the mirror support 20 for any visual requirement dictated by the vehicle operator. Thus, by manual movement of the handle 70 in a vertical or horizontal direction or any movement therebetween, a corresponding movement of the mirror support 20 is realized through the indirect connection provided by the disk member 26. In making this adjustment, the spherical portion 24 of the mirror support 20 is universally seated within the socket composed of the bearing surface 14 while the engagement of the disk member with the flange 38 provides support and controlled movement of the mirror support 20 through the wires 32 and 34.

An important feature of this invention is the latter arrangement which permits the mirror support 20 to be rotated about its axis relative to the disk member because of no direct connection between the mirror support 20 and the disk. It should be noted that the small area adjacent the periphery of the disk member 26 frictionally engages the circular flange member 38 formed within the mirror support 20 so as to permit the relative movement of mirror support. Also, the tab 40 locks the disk member 26 from any rotation about its axis with the result that the mirror support may be rotated about a horizontal axis with respect to the disk member and bracket 10 without fouling or twisting the operating wires.

Although one embodiment of the invention has been shown and described, it is apparent that various modifications and changes may be made therein without departing from the spirit of the invention. Therefore, it should be understood that such changes and modifications are contemplated and the invention is limited only by the scope of the appended claims.

What is claimed is:

1. A remotely controlled mirror mechanism comprising a mounting bracket, a mirror support having a mirror element mounted therein, means universally pivoting said mirror support on said mounting bracket, a disk member frictionally engaging the mirror support so as to control movement thereof in response to movement of the disk member, means pivotally mounting said disk member on said bracket, means providing for rotation of the mirror support relative to said disk member and bracket about an axis substantially perpendicular to the plane of said mirror element, an actuator located remotely from said mounting bracket, and a plurality of operating cables having the opposite ends thereof respectively directly connected at spaced points to said disk member and actuator whereby movement of the latter results in pivotal movement of the disk member and mirror support about axes parallel to the plane of said mirror element.

2. A remotely controlled mirror mechanism comprising a mounting bracket, a mirror support having a mirror element mounted therein, a ball and socket connection universally mounting said mirror support on said bracket, a disk member frictionally engaging the mirror support so as to control movement thereof, a pivot pin mounting said disk member on said bracket, cooperating stop means on said pivot pin and disk member to permit rotation of the mirror support relative to the disk member about an axis substantially perpendicular to the plane of said mirror element, an adjustable actuator located remotely from said mounting bracket, and a plurality of operating cables having the opposite ends thereof respectively connected at spaced points to said disk member and actuator whereby movement of the latter results in pivotal movement of the disk member and mirror support about axes parallel to the plane of said mirror element.

3. A remotely controlled mirror mechanism comprising a mounting bracket, an annular spherical bearing surface on said bracket, a ball member fixed to said bracket centrally of said bearing surface, a mirror support having a mirror element mounted therein, an external annular spherical bearing surface on said mirror support seated in said bracket bearing surface, a disk member frictionally engaging and controlling movement of the mirror support and having a socket portion centrally formed therein, said ball member seated in said socket portion and pivotally supporting the disk member, a remotely located actuator, a pair of cables operatively connecting said disk member to said actuator whereby movement of the latter results in pivotal movement of the disk member and the mirror support about axes parallel to the plane of said mirror element, and cooperating stop means on said ball member and disk member to prevent rotation of the latter about an axis substantially perpendicular to the plane of said mirror element in response to adjustment of said mirror support about said axis.

4. A remotely controlled mirror mechanism comprising a mounting bracket, an annular spherical bearing surface on said mounting bracket, a ball member fixed to tthe mounting bracket centrally of said bearing surface, a mirror support having a mirror element mounted therein, an annular spherical bearing surface rigid with said mirror support and seated in said bracket bearing surface, an annular seating surface formed interiorly of said mirror support, a disk member having a socket portion for cooperating with said ball member so as to provide for pivotal movement thereabout, said disk member having portions frictionally engageable with said annular seating surface to control movement of the mirror support, cooperating stop means on said ball member and socket portion to prevent rotation of the disk member about an axis substantially perpendicular to the plane of the mirror element during rotation of the mirror support about said axis, an actuator housing including a support socket, a manually adjustable actuator member universally mounted in said actuator socket, and a pair of operating cables having the opposite ends thereof respectively connected at spaced points to said disk member and actuator member.

5. The mechanism of claim 4 wherein the disk member has two mounting prongs separated by an angular distance of approximately 90° for supporting the end portions of said pair of operating cables.

6. A remotely controlled mirror mechanism comprising a mounting bracket, an annular spherical bearing surface on said mounting bracket, a ball member fixed to the mounting bracket centrally of said bearing surface, a mirror support having a mirror element mounted therein, an annular spherical bearing surface rigidly formed with said mirror support and seated in said bracket bearing surface, said bearing surfaces cooperating to provide universal movement of the mirror support, an annular seating surface formed interiorly of said mirror support, a disk member having a socket portion for cooperating with said ball member so as to provide for pivotal movement thereabout, said disk member having portions frictionally engageable with said annular seating surface so that pivotal movement of the disk member results in corresponding pivotal movement of the mirror support, cooperating stop means on said ball member and socket portion to prevent rotation of the member about an axis substantially perpendicular to the plane of the mirror element during rotation of the mirror support about said axis, an actuator, operating cables having the opposite ends thereof respectively connected at spaced points to said disk member and said actuator for moving said mirror support to present a desired rear view in response to movement of said actuator.

7. A remotely controlled mirror mechanism comprising a mounting bracket, an annular spherical bearing surface on said mounting bracket, a ball member fixed to the mounting bracket centrally of said bearing surface, a mirror support having a mirror element mounted therein, an annular spherical bearing surface rigidly formed with said mirror support and seated in said bracket bearing surface, said bearing surfaces cooperating to provide universal movement of the mirror support, an annular seating surface formed interiorly of said mirror support, a disk member having a socket portion seating on said ball member for cooperation with said ball member to provide for pivotal movement thereabout, said disk member having portions frictionally engageable with said annular seating surface so that pivotal movement of the disk member results in corresponding pivotal movement of the mirror support, cooperating stop means on said ball member and socket portion to prevent rotation of the disk member about an axis substantially perpendicular to the plane of the mirror element during rotation of the mirror support about said axis, an actuator housing including a support socket, a manually adjustable actuator member universally mounted in said actuator socket, and operating cables having the opposite ends thereof respectively connected at spaced points to said disk member and actuator member.

References Cited by the Examiner

UNITED STATES PATENTS

| | | |
|---|---|---|
| 1,499,640 | 7/1924 | Copeland. |
| 1,560,039 | 11/1925 | Castino _____ 240—61.13 |
| 2,456,362 | 12/1948 | Aves _____ 88—93 |
| 3,046,841 | 7/1962 | Kawecki _____ 88—93 X |

BROUGHTON G. DURHAM, *Primary Examiner.*

JEWELL H. PEDERSEN, *Examiner.*